(No Model.) 6 Sheets—Sheet 1.

T. C. FAWCETT.
BRICK MACHINE.

No. 485,323. Patented Nov. 1, 1892.

WITNESSES: INVENTOR:

(No Model.)  6 Sheets—Sheet 2.
T. C. FAWCETT.
BRICK MACHINE.
No. 485,323.  Patented Nov. 1, 1892.
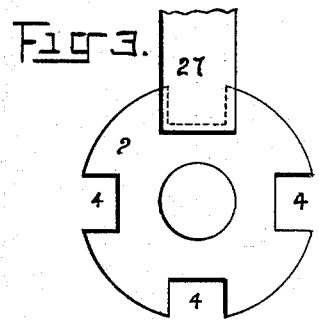
Fig. 3.
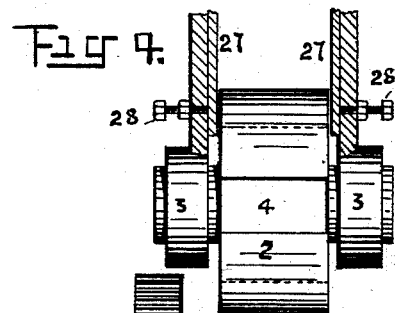
Fig. 4.
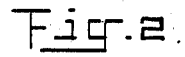
Fig. 2.
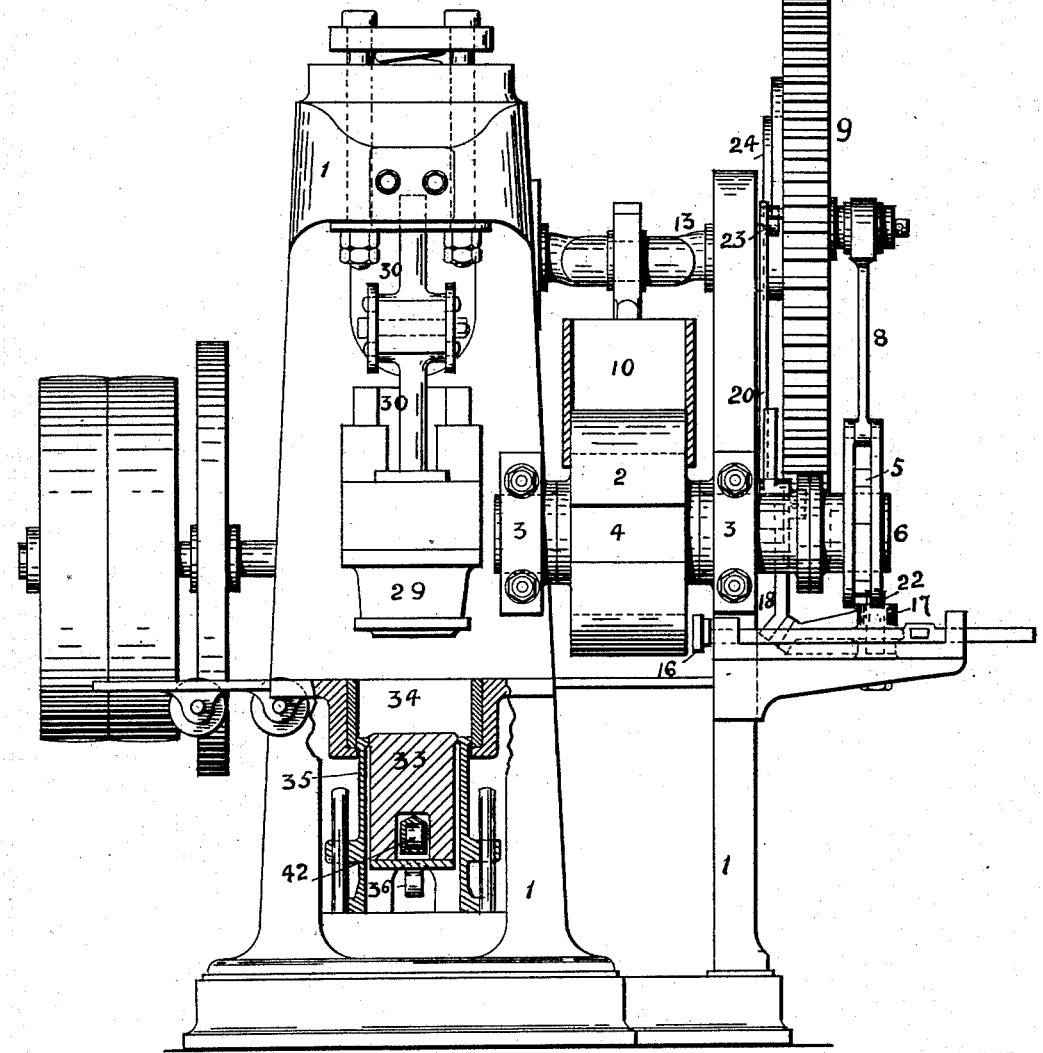
WITNESSES:
Arthur B Crossley
William H. Tempest
INVENTOR:
Thos. C. Fawcett

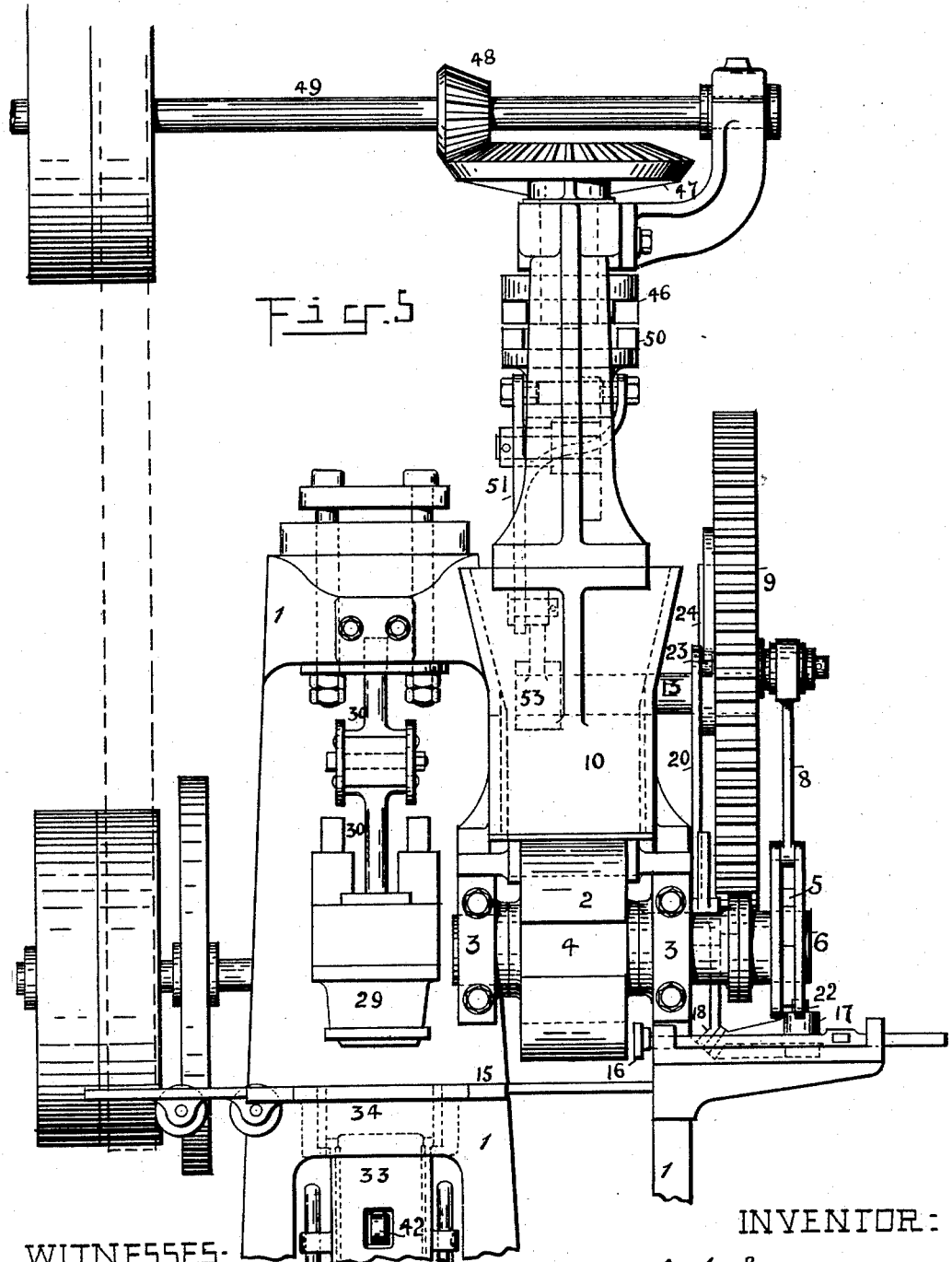

(No Model.) 6 Sheets—Sheet 4.

T. C. FAWCETT.
BRICK MACHINE.

No. 485,323. Patented Nov. 1, 1892.

WITNESSES:
Arthur B Crossley
William H. Tempest

INVENTOR:
Thos. C. Fawcett (No Model.)
T. C. FAWCETT.
BRICK MACHINE.
No. 485,323.
6 Sheets—Sheet 5.
Patented Nov. 1, 1892.
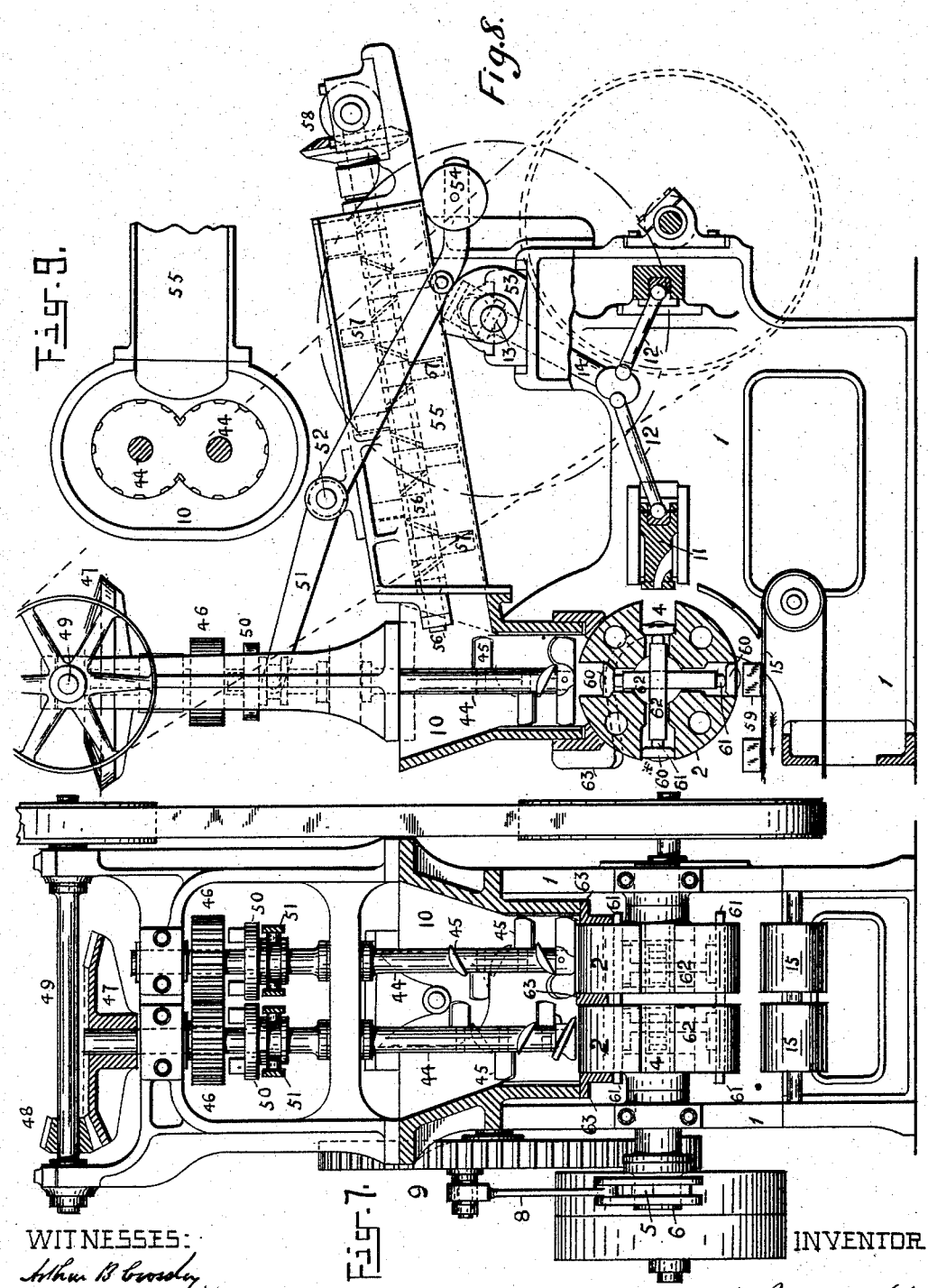
WITNESSES:
INVENTOR:

(No Model.)  6 Sheets—Sheet 6.

T. C. FAWCETT.
BRICK MACHINE.

No. 485,323.  Patented Nov. 1, 1892.

WITNESSES:

INVENTOR:

UNITED STATES PATENT OFFICE.

THOMAS CONSTANTINE FAWCETT, OF LEEDS, ENGLAND.

BRICK-MACHINE.

SPECIFICATION forming part of Letters Patent No. 485,323, dated November 1, 1892.

Application filed August 8, 1892. Serial No. 442,436. (No model.) Patented in England June 17, 1890, No. 9,337, and August 20, 1890, No. 13,078.

*To all whom it may concern:*

Be it known that I, THOMAS CONSTANTINE FAWCETT, a citizen of Great Britain, residing at Leeds, in the county of York, England, have invented certain new and useful Improvements in Brick-Making Machines, (for which I have obtained patents in England, No. 9,337, dated June 17, 1890, and No. 13,078, dated August 20, 1890;) and I do hereby declare the following to be a full, clear, and exact description of the invention, such as will enable others skilled in the art to which it appertains to make and use the same.

This invention has for its object the manufacture of fire or other form of brick from a plastic or semi-plastic clay or other like material in a quick and expeditious manner and in large quantities.

The machine constructed according to my invention has also combined with it mechanism to press the brick after it has left the mold. Appliances are also employed for the purpose of removing the brick from the mold, and appliances are also used for forcing the clay into the mold.

In order that my invention may be better understood, I will now make reference to the accompanying sheets of drawings, wherein—

Figure 1:
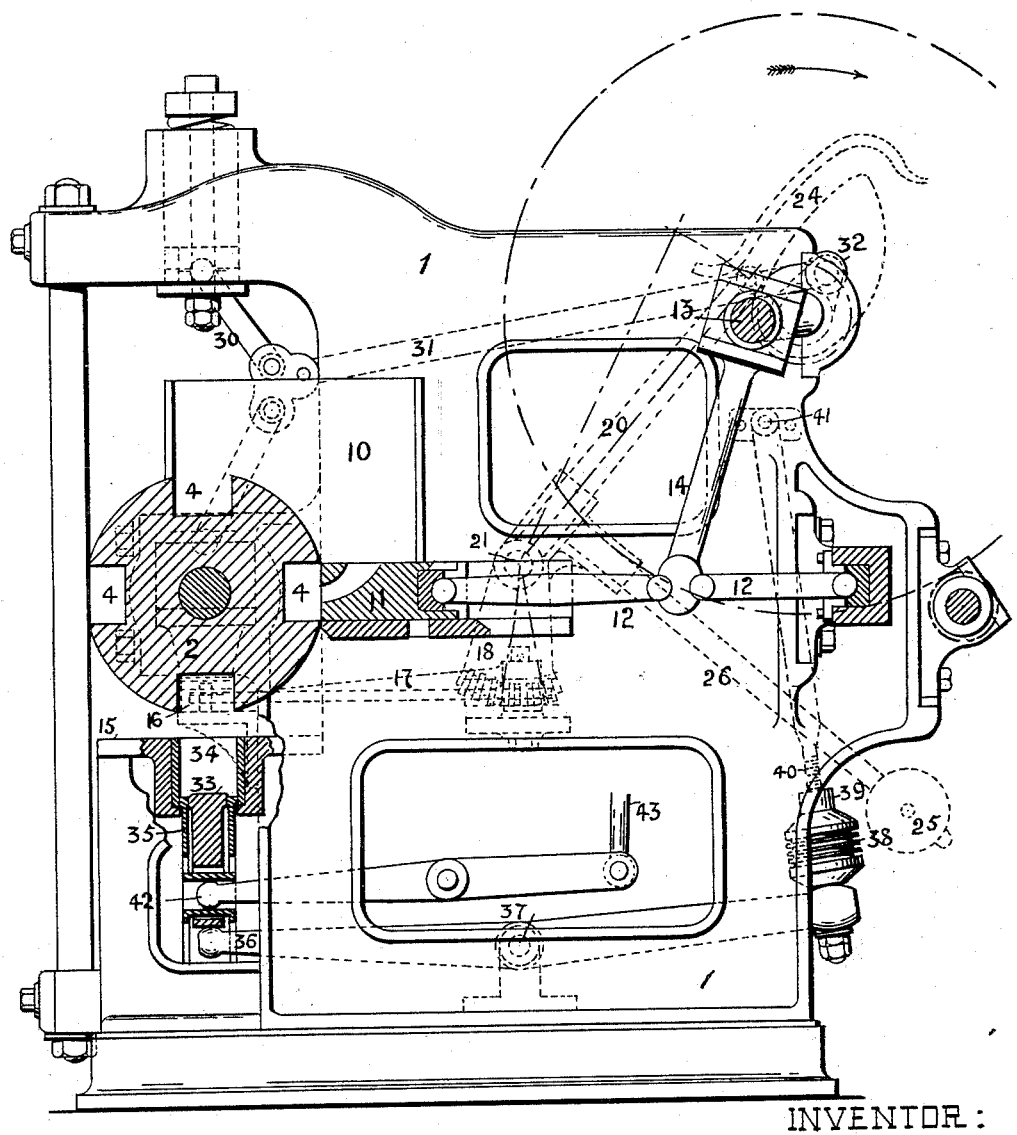
Figure 6:
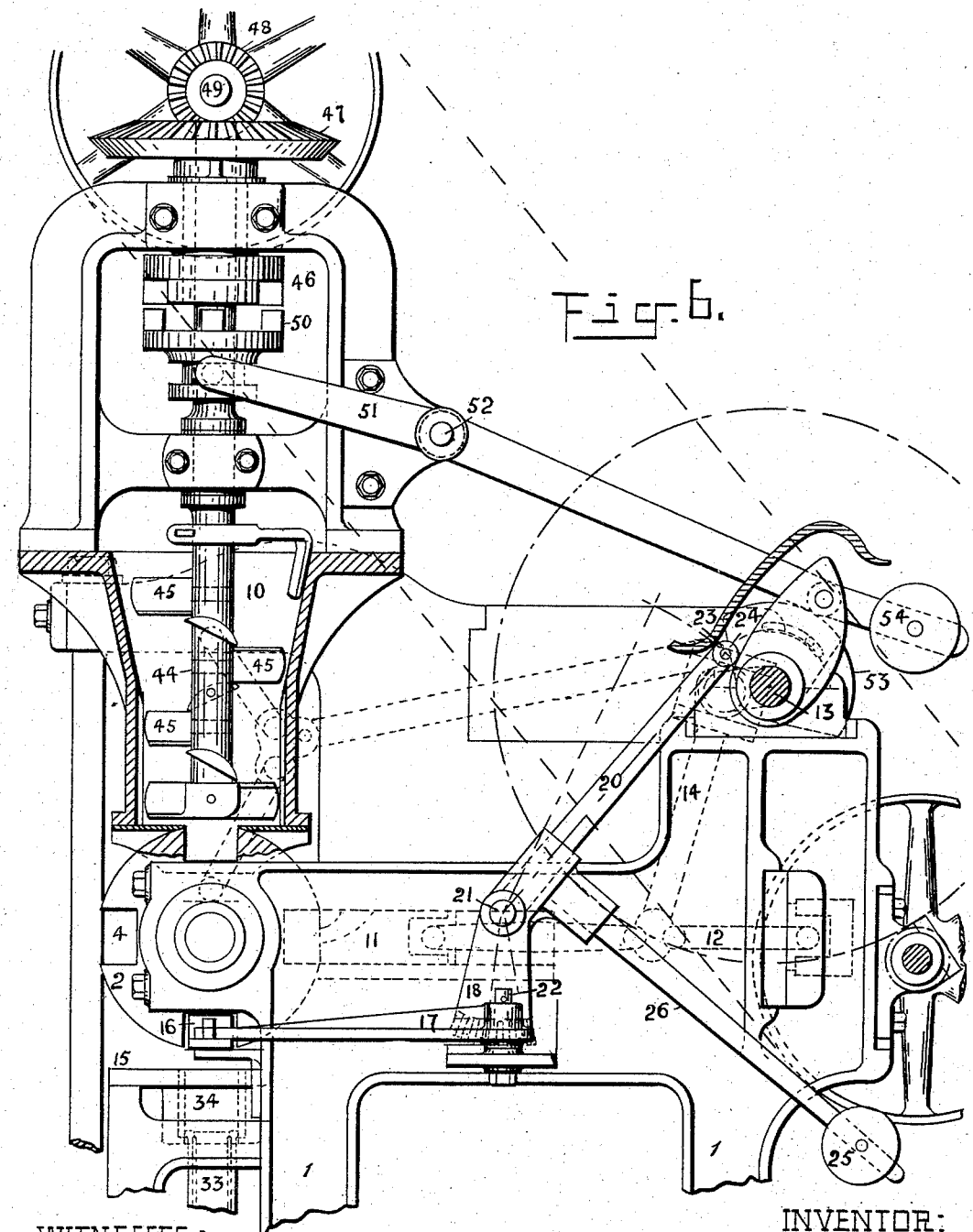
Figure 10:
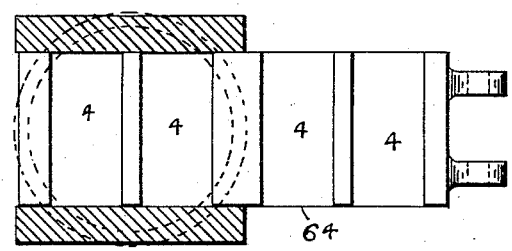
Figure 11:
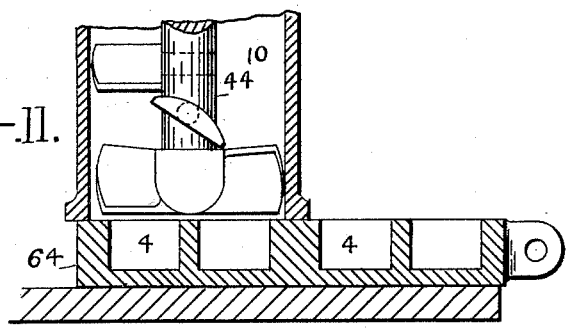
Figure 12:
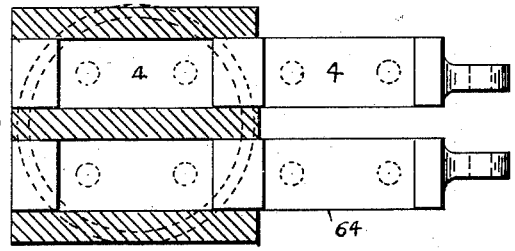
Figure 13:
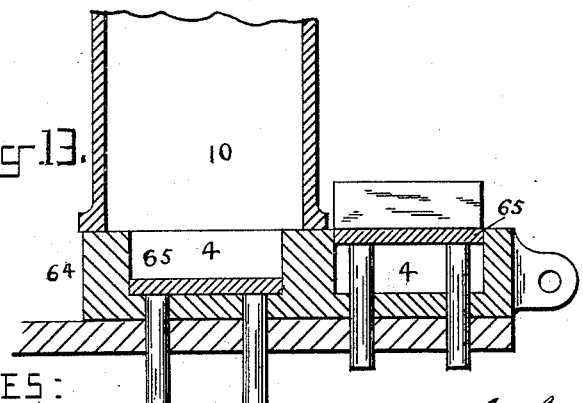

Figure 1 is a side elevation, partly in section, of a brick making and pressing machine having my improvements applied to it; and Fig. 2 is a front elevation of same, also partly in section. Figs. 3 and 4 are respectively detail end and plan views of the cylinder 2 and plate 27. Figs. 5 and 6 are respectively a front view and a longitudinal section of a brick-machine similar to that shown in Figs. 1 and 2, but having a pug-mill in its clay-hopper. Figs. 7 and 8 are respectively end and side views, partly in section, of a brick-machine provided with duplicate cylinders 2. Fig. 9 is a detail plan view of the clay-mixer 55. Figs. 10 and 11 are respectively a detail plan view and a longitudinal section of a flat mold for the clay. Figs. 12 and 13 are respectively a detail plan view and a longitudinal section and show a modification of the flat mold shown in Figs. 10 and 11.

1 represents the framework of the machine, and 2 an intermittently-revolving molding-cylinder mounted in bearings or pedestals 3, such cylinder having four openings or dies 4 for the reception of the clay from which the brick has to be made. This cylinder is revolved intermittently, so that it remains stationary for a short period to permit the clay to be inserted into the dies and also to permit the newly-formed brick to be removed. The intermittent rotary motion is obtained through the medium of a ratchet-wheel 5, fixed on the end of the axle 6 of the molding-cylinder 2. A pawl 8, connected eccentrically to the driving-wheel 9, is arranged to push the ratchet-wheel forward a tooth for each revolution of the said driving-wheel. The clay is contained in a hopper 10, and it is removed therefrom and forced into one of the molds of the revolving cylinder by means of a reciprocating rammer 11, such rammer being operated intermittently by the toggle-jointed levers 12, operated by crank-shaft 13, driven from the driving-wheel 9. These toggle-jointed levers 12 are regulated so as to permit the rammer 11 each time one of the molds 4 in the revolving cylinder is presented to the said rammer to enter therein, the pressing of the brick also taking place during the time the cylinder 2 is stationary. The connecting-arm 14 of the toggle-jointed levers is of such a length as to carry the toggle-jointed levers 12 slightly below a horizontal line, so that on the upward or return movement of the connecting-arm the rammer is made to give the brick another squeeze, by which means the brick is pressed twice for one revolution of the shaft during the temporary stoppage or dwell of the molding-cylinder 2. The openings or dies 4 of the molding-cylinder 2 are made with both ends open, the width of the cylinder being equal to the length or width of the brick, and these molds are made open-ended, so as to permit the brick to be pushed out endwise onto the table 15 or onto a traveling apron. The means I employ for pushing the bricks endwise out of their openings or dies consists of a pusher 16, connected to one end of a rocking lever-arm 17, such lever-arm being provided with a few bevel-wheel-shaped teeth, gearing with the segment of a bevel-wheel 18, the upper end of which is connected to a connecting-rod 20, which on being moved backward and forward upon the fulcrum 21 causes the lever-arm 17 to rock or oscillate upon the vertical stud 22, whereby an intermittent motion is given to the pusher 16, which forces the brick out of the die. The toothed segment 18, as already stated, is connected to the rod 20, the opposite end of which carries a bowl 23, working within a cam-groove 24, formed at the back of the driving-wheel 9, such cam-groove moving the segment 18 in one direction, while the opposite movement is obtained from the weight 25, fixed on an arm 26, also connected to the toothed segment 18.

To prevent the brick being forced laterally out of the dies 4 of the open-ended cylinder 2 during the time the rammer 11 is forcing the clay into the die, the cylinder 2 is made to revolve between two side plates 27, (shown in plan view, Figs. 3 and 4,) the said plates 27 being connected to the framework of the machine. These side plates are pressed with a suitable pressure against the sides or cheeks of the revolving cylinder 2, the pressure thereon being regulated by the adjusting-screws 28.

By employing an open-ended cylinder for molding bricks there are fewer corners to contend with. Consequently the brick is more easily removed and the corners thereof are more acute. After the brick has been pushed endwise out of the mold the pusher 16 is arranged to push the brick over the mold 34 and underneath a reciprocating top-pressing rammer 29 for the purpose of imparting to the brick its final squeeze and finishing shape. The top-presser is operated by toggle-jointed levers 30, like those already described with reference to the rammer 11. These toggle-jointed levers are operated by connecting-rod 31 and crank 32 from the crank-shaft 13, and the said toggles are arranged to go past a vertical line, so as to give the brick two squeezes in addition to those already received when the clay is in the molding-cylinder. In molding-boxes of ordinary construction openings or apertures are made therein for the escape of superfluous clay; but I employ instead thereof apparatus consisting of an inner yielding piston 33, working within the brick-pressing mold 34, the top of which piston shapes a portion of the bottom of the brick, while the second piston 35 is used for shaping or forming the outer edges of the bottom of the said brick. The bottom of the yielding piston 33 rests upon one end of the lever 36, working on a fulcrum 37, the opposite end of such lever 36 being provided with india-rubber, spiral, or other form of spring-cushion 38, the tension of which is made adjustable by lock-nuts 39 on the rod 40, fixed to the framework at 41. Therefore when the top-pressing rammer 29 has reached the extent of its downward stroke and there is more clay in the mold than the size of the brick intended to be made, instead of such superfluous clay working through apertures, as formerly, the inner piston 33 will yield through the medium of the springs 38, whereby the superfluous clay is put into the brick; but as soon as the pressure of the top-presser 29 is removed from the top of the brick the inner piston 33, through the medium of the lever 36 and springs 38, is made to assume or go back to its normal position again. After the brick has been thus pressed it is raised from the mold, together with pistons 33 and 35, by the lever 42, which is operated by connecting-rod 43, driven from a crank (not shown) on the shaft 13.

Figs. 5 and 6 of the accompanying drawings illustrate a plastic-brick making and pressing machine like that already described, except that within the hopper I introduce a pug-mill consisting of an intermittently-revolving vertical shaft 44, provided with wings or vanes 45 for the purpose of forcing the clay into the molds as they are presented thereto. I prefer to cause this vertical shaft to revolve intermittently, so that when the plain surface of the mold is passing underneath the bottom of the said shaft the clay within the hopper is not forced against the dead-surface. I therefore cause the spindle to revolve only when one of the dies is underneath the hopper 10. The mechanism I employ for imparting intermittent motion to the vertical shaft 44 is shown more clearly in Fig. 6, where 46 is half of a clutch fastened to a sleeve or long boss secured to the bevel-wheel 47, which is driven positively and continuously by bevel-wheel 48 on the driving-shaft 49. On the vertical shaft 44 is another half-clutch 50, placed loosely on the said shaft, but working in a groove or key-bed formed therein. This clutch 50 is raised up and down at the proper time, so as to cause the shaft 44 to be driven by means of the weighted lever 51, working upon the fulcrum 52, raised or lifted by adjustable cam 53 on the shaft 13. The clutch 50 is kept clear of the driving-clutch 46 by means of the cam 53 on the shaft 13; but when the cam 53 is not supporting the lever 51 the weight 54 thereon lifts the clutch 50 into gear with the driving-clutch 46, whereby intermittent motion is given to the vertical shaft 44 for forcing the clay from the hopper into the molds of the cylinder 2.

Figs. 7 and 8 are respectively end and side elevations, partly in section, of my improved plastic-brick-making machine; but in this case the machine is compounded—that is to say, there are two intermittently-revolving molding-cylinders 2, each of which has a pug-mill 44 employed in connection with them or a revolving vertical shaft 44, with wipers, as already described, and although I only show two revolving molding-cylinders it is evident that there may be three or more arranged side by side. In connection with these revolving shafts 44 I also employ a clay-mixer. (Shown at 55 in Fig. 8, and plan, Fig. 9.) This clay-mixer 55 is composed of a shaft 56, placed in an oblique position, having wipers or blades 57 thereon, which are caused to revolve by bevel-gearing 58 for the purpose of mixing the clay before it enters into the hopper 10. The clay is forced into the molds of the cylinder by the pug-mill and it is pressed by the rammer 11, operated by toggle-joints 12, as previously explained. The molding-cylinder is made with open ends similar to those previously mentioned; but instead of the brick which is shown at 59 being pushed out sidewise it is removed by the bottom plate 60 or base of the die, which is movable for the purpose. The bottom of the dies are indicated at 60 attached to horizontal bars 61, which are connected together by the parts marked 62. Between the two molding-cylinders and at each side thereof there are cam-plates 63, which serve to prevent the clay from being forced out of the open-ended dies on being thrust in by the pug-mill; but these plates are of cam-like shape on the under side, so that as the molding-cylinder revolves the horizontal bars 61 pass underneath the cam-plates 63, in doing which the base of the die 60, which occupies the position shown at 60*, is forced downward, so as to present an empty die 4 under the pug-mill; but when the bottom plate is lowered the opposite or opposing end is also lowered, in doing which the brick within the die is ejected, dropping onto the endless traveling apron 15, and this goes on intermittently as the bricks are formed.

Instead of employing a revolving molding-cylinder 2, I employ a flat molding-plate, having dies or openings therein. (Shown in plan view, Fig. 10, and elevation, Fig. 11, where 64 is a plate provided with molds 4 the length and width of a brick.) This molding-plate is pushed under the pug-mill 44 and clay forced therein, and it is then withdrawn from underneath the pug-mill and the bricks pushed out of the mold endwise by the pusher 16, as described and shown with regard to Figs. 1 to 6.

Fig. 12 shows another form of molding-plate; but in this case the molds 4 are shown the narrow way of the brick, so that the stroke of the pusher 16 is shorter than would be the case if the brick were pushed the direction of its length, as shown in Figs. 10 and 11; but the dies 4 may be provided with movable bottom plates 65 and the bricks lifted from the dies and removed from under the pug-mill. The mechanism for lifting the bottom plates 65 will consist of the moving piston, (marked 33 and illustrated in Fig. 1.)

I claim as my invention—

1. In a brick-making machine, the combination of an intermittently-revolving molding-cylinder 2, having open ends, together with the pusher 16, operated by toothed segment 18 and cam 24 on the shaft 13, for the purposes described.

2. In a brick-making machine, the combination of an intermittently-revolving molding-cylinder 2, having open ends, of a pusher 16, operated by toothed segment 18 and cam 24 on the shaft 13, and an intermittent rammer 11, operated by toggle-jointed levers 12 and connecting-rod 14, the latter of which causes the toggle-joints to give two squeezes for one revolution of the shaft 13, all as described.

3. In a brick-making machine, the combination, with an open-ended mold, of a rammer for pressing the clay into the mold, a pusher for forcing the brick out of the mold, and driving mechanism operating to move the said mold, rammer, and pusher intermittently, the rammer being moved twice as often as the pusher and the mold being moved alternately with the two movements of the rammer, substantially as set forth.

4. In a brick-making machine, the presser 29, moved up and down by toggle-jointed levers 30 and connecting-rod 31, the latter of which is of such a length as to cause the presser to impart two squeezes to the brick for one revolution of the shaft 13, in combination with the inner piston 33 and outer piston 35, the said piston 33 yielding to pressure of clay when forced into the die through the medium of lever 36 and cushion 38, together with lever 42 for lifting both pistons 33 and 35 when removing the brick from the die 34, all as described.

5. A brick making and pressing machine comprising an open-ended revolving molding-cylinder 2, brick-pusher 16, intermittent revolving pug-mill 44, clutch-boxes 46 and 50, operated by lever 51, and cam 53, rammer 11, toggle-jointed levers 12, and connecting-rod 14, all as described.

In testimony whereof I affix my signature in presence of two witnesses.

THOMAS CONSTANTINE FAWCETT.

Witnesses:
  CHAS. GILLIARD,
  CHAS. JNO. BRICE,
    *Both of Bank Street, Leeds.*